(12) United States Patent
Kesseli

(10) Patent No.: US 6,895,760 B2
(45) Date of Patent: May 24, 2005

(54) MICROTURBINE FOR COMBUSTION OF VOCS

(75) Inventor: James B. Kesseli, Greenland, NH (US)

(73) Assignee: Ingersoll-Rand Energy Systems, Inc., Portsmouth, NH (US)

(*) Notice: Subject to any disclaimer, the term of this patent is extended or adjusted under 35 U.S.C. 154(b) by 54 days.

(21) Appl. No.: 10/627,395

(22) Filed: Jul. 25, 2003

(65) Prior Publication Data

US 2004/0070212 A1 Apr. 15, 2004

Related U.S. Application Data

(60) Provisional application No. 60/398,462, filed on Jul. 25, 2002.

(51) Int. Cl.[7] ............................................ F23R 3/40
(52) U.S. Cl. ............................................ 60/777; 60/723
(58) Field of Search .................. 60/723, 777; 431/285, 431/284, 5, 7

(56) References Cited

U.S. PATENT DOCUMENTS

| | | | |
|---|---|---|---|
| 3,790,350 A | * | 2/1974 | Haensel ...................... 422/222 |
| 4,509,333 A | | 4/1985 | Nussdorfer et al. |
| 4,794,753 A | * | 1/1989 | Beebe ......................... 60/796 |
| 4,864,811 A | | 9/1989 | Pfefferle |
| 4,974,530 A | | 12/1990 | Lyon |
| 5,108,717 A | | 4/1992 | Deller et al. |
| 5,161,366 A | * | 11/1992 | Beebe ......................... 60/777 |
| 5,369,947 A | | 12/1994 | Dummersdorf et al. |
| 5,592,811 A | | 1/1997 | Dodge et al. |
| 5,673,553 A | | 10/1997 | Maese et al. |
| 5,718,112 A | | 2/1998 | Dodge et al. |
| 5,826,429 A | * | 10/1998 | Beebe et al. ................... 60/723 |
| 5,832,713 A | | 11/1998 | Maese et al. |
| 5,912,198 A | * | 6/1999 | Feitelberg et al. ......... 48/197 R |
| 5,983,992 A | * | 11/1999 | Child et al. .................... 165/81 |
| 6,107,693 A | | 8/2000 | Mongia et al. |
| 6,205,768 B1 | * | 3/2001 | Dibble et al. ............. 60/39.511 |
| 6,226,976 B1 | | 5/2001 | Scott et al. |
| 6,251,347 B1 | | 6/2001 | Campbell et al. |
| 6,313,544 B1 | | 11/2001 | Mongia et al. |
| 6,393,727 B1 | | 5/2002 | Seelig et al. |
| 2003/0088139 A1 | | 5/2003 | Nagji |

OTHER PUBLICATIONS

Edward C. Moretti, Reduce VOC and HAP Emissions, CEP Magazine, Jun. 2002, pp. 30–40.

* cited by examiner

*Primary Examiner*—Ehud Gartenberg
(74) *Attorney, Agent, or Firm*—Michael Best & Friedrich, LLP

(57) ABSTRACT

A microturbine engine operable to combust a flow of VOCs without a combustor. The microturbine engine comprising a compressor having an inlet, the inlet receiving a mixture of air and VOCs, the compressor operable to produce a flow of compressed air and VOCs. The invention also includes a reaction chamber including a reactor bed. The flow of compressed air and VOCs is combusted within the reactor bed to produce a flow of products of combustion. The invention includes a turbine driven by the flow of products of combustion from the combustor and a generator coupled to the turbine. The generator is driven by the turbine at a speed to produce electrical power.

26 Claims, 5 Drawing Sheets

US 6,895,760 B2

MICROTURBINE FOR COMBUSTION OF VOCS

RELATED APPLICATION DATA

This application claims benefit under 35 U.S.C. Section 119(e) of U.S. Provisional Application 60/398,462 filed Jul. 25, 2002.

BACKGROUND OF THE INVENTION

The present invention relates to a system and method for combusting VOCs. More particularly, the present invention relates to a system and method including a microturbine engine operable to provide electricity and combust VOCs.

Microturbine engines are relatively small and efficient sources of power that can generate electricity and/or power auxiliary equipment such as pumps or compressors. Microturbine engines include one or more turbines that rotate in response to a flow of high-temperature, high-pressure gas. Many sources of hot gas are possible with combustion systems employing combustors being the most common. Combustor systems operate most efficiently with a steady flow of fuel having a consistent heat value.

Volatile organic compounds (VOCs) are often combustible and as such are disposed of by combusting them in open air or in a reactor. The heat generated by the combustion of the VOCs often goes to waste. However, VOCs are often delivered at inconsistent rates and have varying heating values. These variations make it difficult to use VOCs as the primary fuel supply for a microturbine engine.

SUMMARY

The present invention provides a system and method for volatile organic compound disposal that uses volatile organic compounds as the fuel for power generating equipment including a microturbine engine. Because the present invention combusts volatile organic compounds in the microturbine without the use of a combustor, it may be used in place of known thermal oxidizer equipment. At the same time that it disposes of volatile organic compounds, the present invention generates usable electricity. Additionally, the present invention provides a means for utilizing waste heat from the microturbine engine for the cogeneration of hot water or for some other useful purpose.

BRIEF DESCRIPTION OF THE DRAWINGS

FIG. 3b is a top view of the pre-heater of FIG. 3a;

FIG. 4b is a cross-section view taken along line B—B in FIG. 4a.

Figure 1:
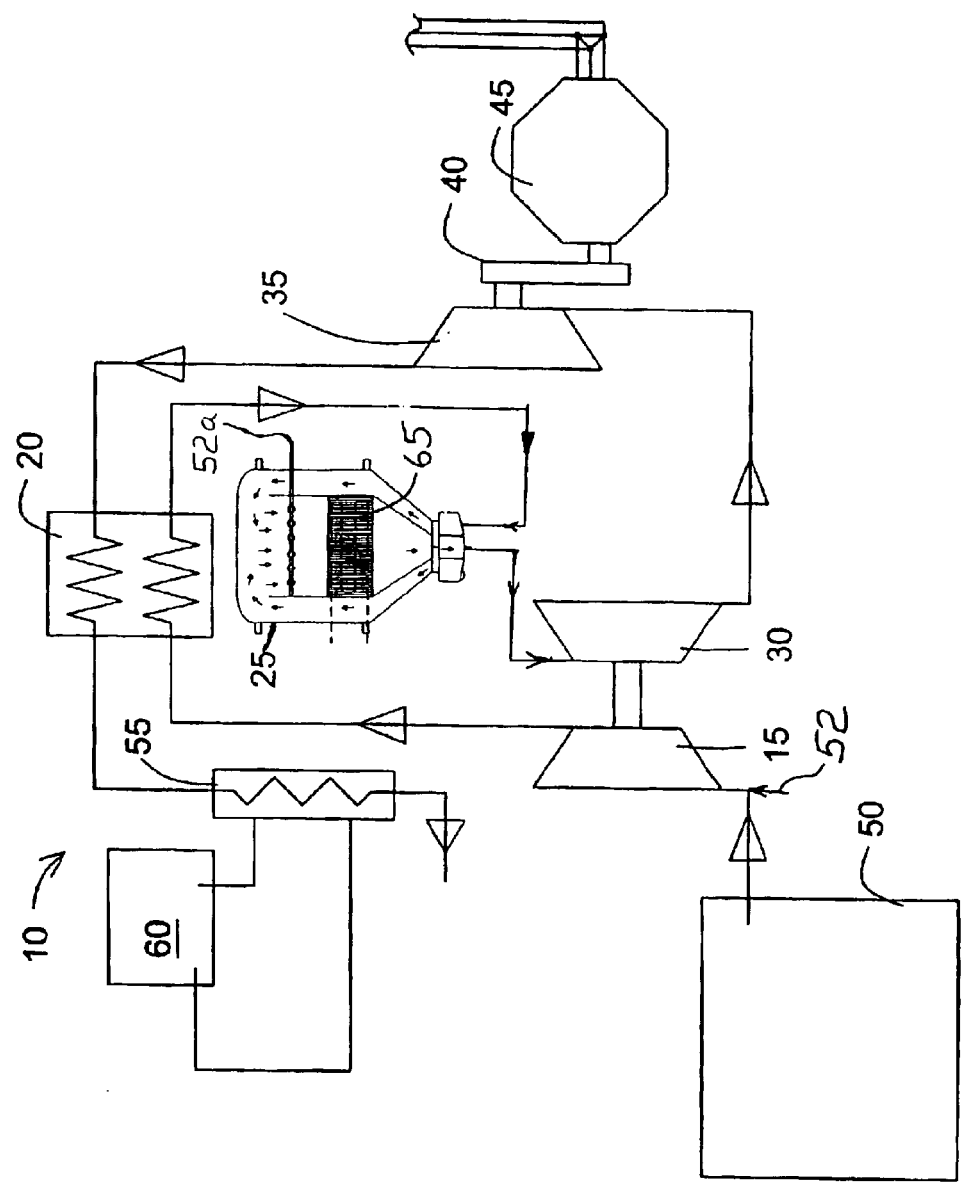
FIG. 1 is a schematic illustration of a recuperated microturbine engine having a VOC reactor embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

The invention described herein is for use with volatile organic compounds ("VOCs"), which are used as fuel for the microturbine engine system described below. The term VOC includes those types of compounds that are the by-products or waste products of systems that process or otherwise use or create volatile chemicals. For example, manufacturers or producers of PVC, plastics, rubber, glue, varnish, petrochemicals, pharmaceuticals, and organic chemicals may create VOCs. Companies that employ paint spraying booths that use air guns to apply paint to products may also create VOCs. Other examples of companies that may produce VOCs include oil refineries, furniture manufacturers and refurbishers, and computer chip manufacturers that use solvents to clean the chips. There are many other companies that produce VOCs, and the foregoing is not intended to be a limiting list. VOCs are also sometimes referred to as hazardous airborne pollutants ("HAP") or solvent-laden air ("SLA").

FIG. 1 schematically illustrates a microturbine engine 10 used for generating electricity. The engine 10 includes a compressor 15, a recuperator 20, a reactor chamber 25, a gasifier turbine 30, a power turbine 35, a gearbox 40, and a generator 45. The microturbine engine 10 communicates with the exhaust (e.g., a chimney or exhaust stack) of a VOC-producing system 50 upstream of the compressor 15. Ambient air and possibly make-up fuel 52 is mixed with the VOCs, depending upon the heating value of the mixture. The addition of make-up fuel serves to increase the heating value of the mixture to a desired level. The make-up fuel is not combusted within a combustor. Rather, the make-up fuel mixes with the air and VOCs and is combusted as it passes through the reactor chamber 25. The mixture is compressed by the air compressor 15 and routed into the recuperator 20. In the recuperator 20, the compressed air and fuel mixture is preheated by exhaust gasses from the power turbine 35 and routed into the reactor chamber 25, where the air/fuel mixture is combusted (as will be described in greater detail below). The recuperator 20 and ducting are designed to avoid premature ignition of the mixture upstream of the reactor chamber 25.

The products of combustion from the reactor chamber 25 are routed into the gasifier turbine 30. The fuel/air ratio is regulated (i.e., the flow of fuel is regulated) to produce a turbine inlet temperature within practical limits between 1500 F. and 2000 F. To achieve this, a temperature sensor (e.g., thermocouple) is positioned to measure a desired temperature. A controller adjusts the flow of make-up fuel to the engine intake 52 in response to the temperature measured by the sensor. The fuel flow can be adjusted by manipulating a valve, adjusting the speed of a compressor, or any other known means. It should be noted that other temperatures or quantities can be measured and used to control fuel flow. For example, other constructions may measure a turbine exhaust temperature and adjust fuel flow based on that reading. Still other constructions may measure fuel pressure and adjust the fuel flow rate based on the pressure reading.

The products of combustion flow into the turbine sections 30 and 35. The gasifier turbine 30 receives the flow of products of combustion from the reactor chamber 25 and powers the compressor. The products of combustion exit the gasifier turbine 30 and flow to the power turbine 35. The power turbine 35 drives the gearbox 40, which has an output shaft that drives the power generator 45 at a desired speed. The generator 45 provides power (e.g., 50 or 60 Hz, three phase electric power) to the end user. The products of combustion are still quite hot when they flow out of the power turbine 35 as exhaust gas. The exhaust gas is routed into the hot side of the recuperator 20 to preheat the compressed air and fuel mixture, as mentioned above.

Even when the exhaust gas exits the recuperator 20, it has a temperature on the order of 400° F. The hot exhaust gas may therefore be used in a cogeneration application. For example, FIG. 1 illustrates a heat exchanger 55 in which the remaining heat in the hot exhaust gas, or so-called "waste heat," is used to heat water for a water heater 60. The waste heat can be used for many other applications, including without limitation: a pre-heater for air used in an industrial process, space heating, domestic water heating, and absorption cooling.

Figure 2:
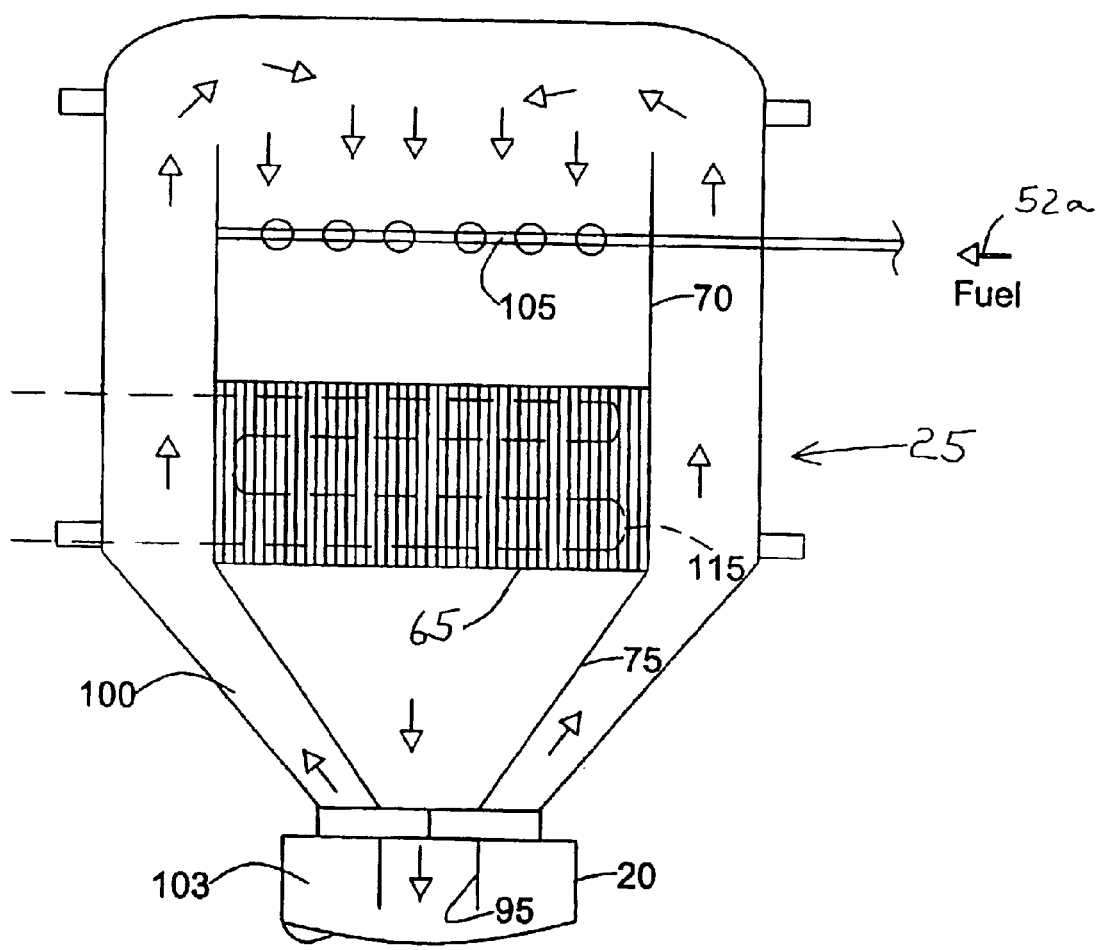
FIG. 2 is a side cross-section view of the VOC reactor of FIG. 1.

FIG. 2 better illustrates the top of a manifold of the recuperator 20 and the reactor chamber 25 mounted thereon. The reactor chamber 25 may be mounted on, within, or outside of the recuperator 20. Where a large reactor chamber 25 is necessary for a particular type of VOC, it is advantageous to mount the reactor chamber 25 on or outside of the recuperator 20 to afford increased volume for a reactor bed 65.

Before proceeding, it is important to note the differences between a reactor or reactor bed and a combustor. A combustor is a zone for nearly adiabatic flame combustion of a fuel-air mixture within a microturbine engine. Reactor beds or reactors, on the other hand, provide for non-adiabatic combustion within the small interstitial spaces of the reactor bed. An ideal combustor transfers no heat to the walls of the combustor, while an ideal reactor bed transfers some of the heat of combustion to the walls of the bed such that the walls enhance flame stabilization. As such, a reactor or reactor bed is not a combustor, and a combustor is not a reactor bed.

A recuperator of the type for use in the present invention is described and illustrated in U.S. Pat. No. 5,983,992, issued Nov. 16, 1999, the entire contents of which are incorporated herein by reference. As shown and described in the aforementioned patent, the recuperator 20 includes a plurality of stacked cells that are open at each end to inlet and outlet manifolds and which route the flow of compressed air and fuel from the inlet manifold to the outlet manifold. Between the cells are exhaust gas flow paths that guide the flow of hot exhaust gas between the cells. There are fins in the cells and in the exhaust gas flow paths to facilitate the transfer of heat from the exhaust gas to the compressed air and fuel mixture.

With continued reference to FIG. 2, the reactor bed 65 is supported within the reactor chamber 25 by a ring support and flow guide 70, which is supported by a cone or funnel 75. The cone 75 communicates with a conduit 95 that extends from the reactor bed 65 through the recuperator outlet manifold and into the gasifier turbine 30. An annular flow chamber 100 is therefore defined within the outlet manifold 103 around the conduit 95 and within the reactor chamber 25 around the ring support 70 and cone 75. During operation of the engine 10, the preheated compressed air, VOC, and possible make-up fuel mixture flows into the annular chamber 100 in the outlet manifold and reactor chamber 25, and then down through the reactor bed 65.

As the preheated compressed air and fuel mixture filters through the reactor bed 65, the mixture reaches a temperature sufficient to ignite the mixture. A thermal gradient within the reactor bed 65 is created by axial conduction from the reaction zone within the central section of the reactor passages. Heat conducted upstream within the reactor passages pre-heats the entering flow to the ignition point. The residence time of the fuel/air mixture within the reactor bed 65 is controlled by design to thoroughly complete the reaction within the reactor bed 65. Thus, the reactor bed 65 has a length that is sufficient to achieve complete combustion. Products of combustion pass out of the reactor bed 65 and flow through the cone 75 into the conduit 95. Within the conduit 95, the products of combustion flow down through the outlet manifold and into the gasifier turbine 30, as described above.

The engine 10 maintains a substantially constant and uninterrupted flow of air/fuel mixture into the reactor chamber 25 to therefore sustain a substantially constant gas temperature within the combustion conduit 95. The combustion of the air/fuel mixture maintains the thermal gradient within the reactor bed 65, thereby maintaining the desired operating turbine inlet temperature range. As a means of control, compensation for inevitable incoming fluctuations of VOC concentrations is accomplished by addition of fuel or dilution air at the compressor inlet.

Figure 3A:
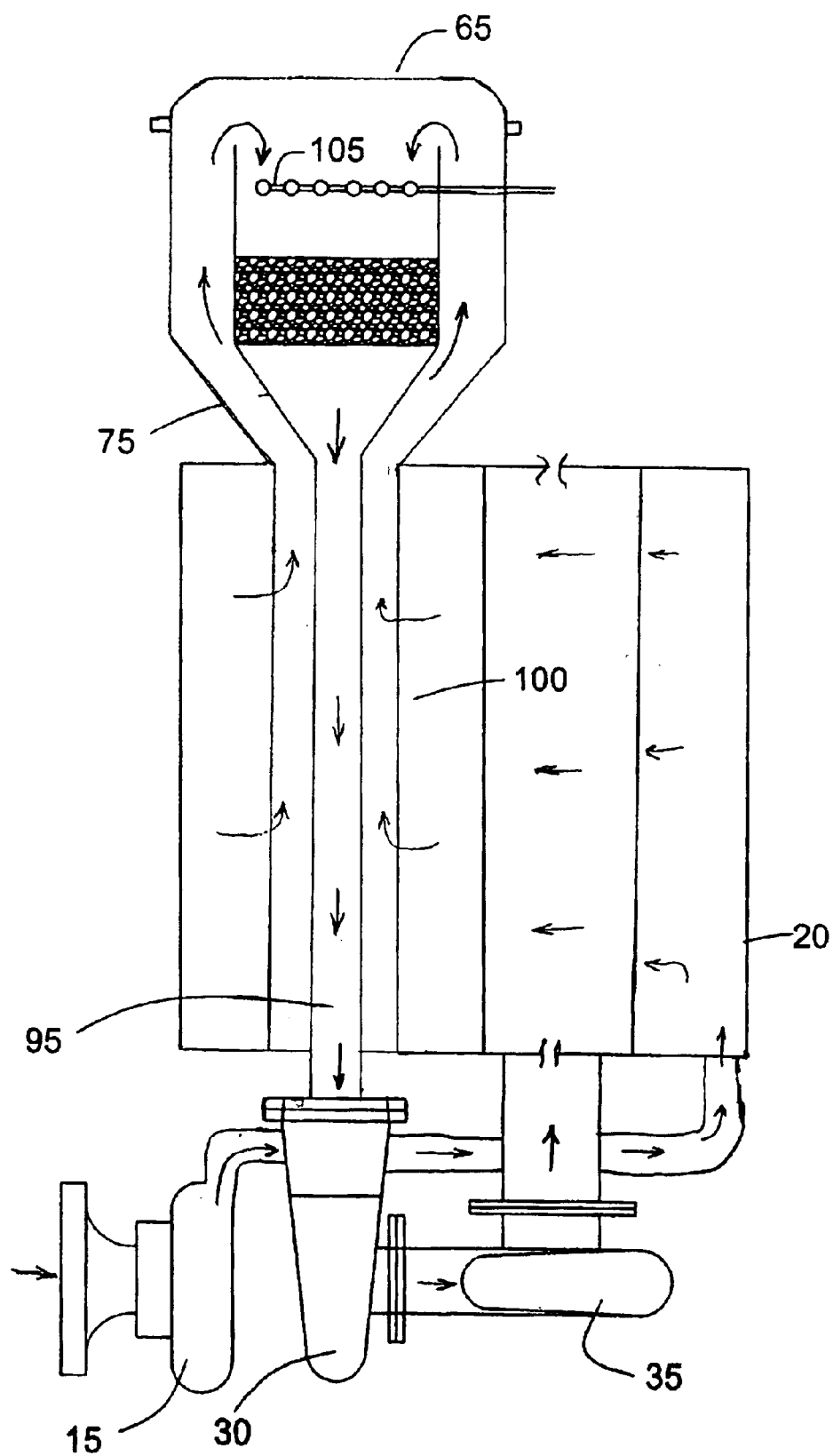
FIG. 3a is a schematic view of a recuperator, a reactor chamber, and a pre-heater.
Figure 3B:
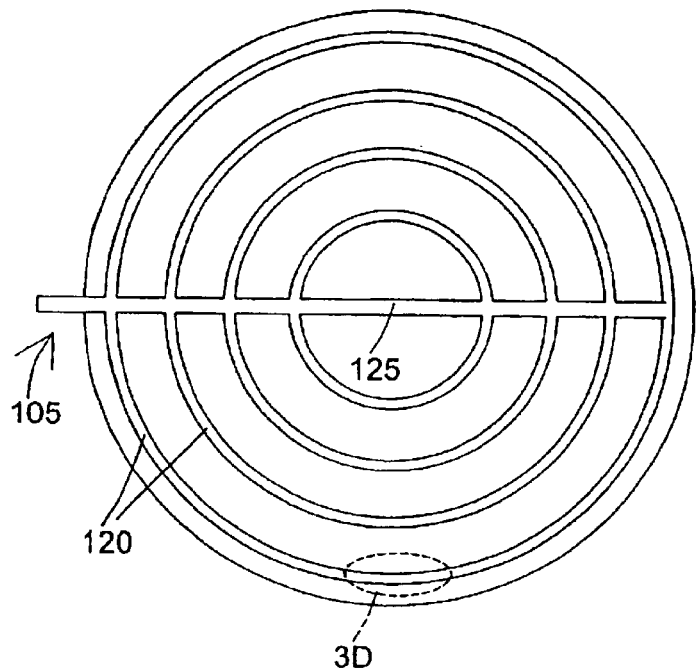
Figure 3C:
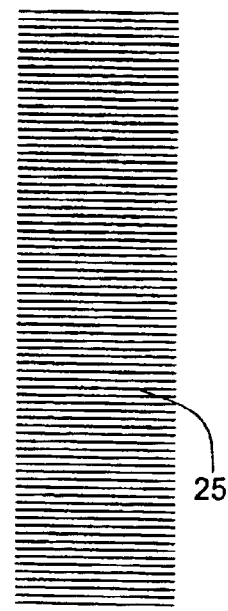
FIG. 3c is a side view of a reactor bed.
Figure 3D:
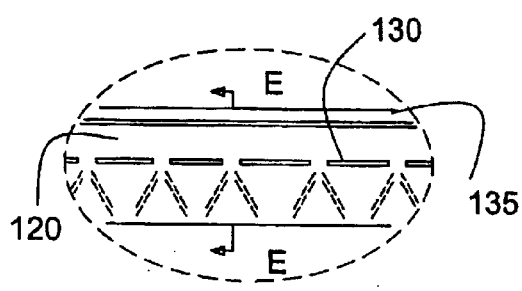
FIG. 3d is a side cross-section view of the portion of the pre-heater encircled in FIG. 3b.
Figure 3E:
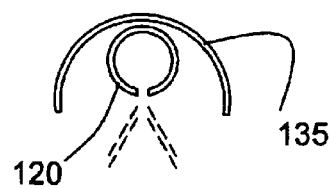
FIG. 3e is a cross-section view taken along line E—E in FIG. 3d.
Figure 4A:
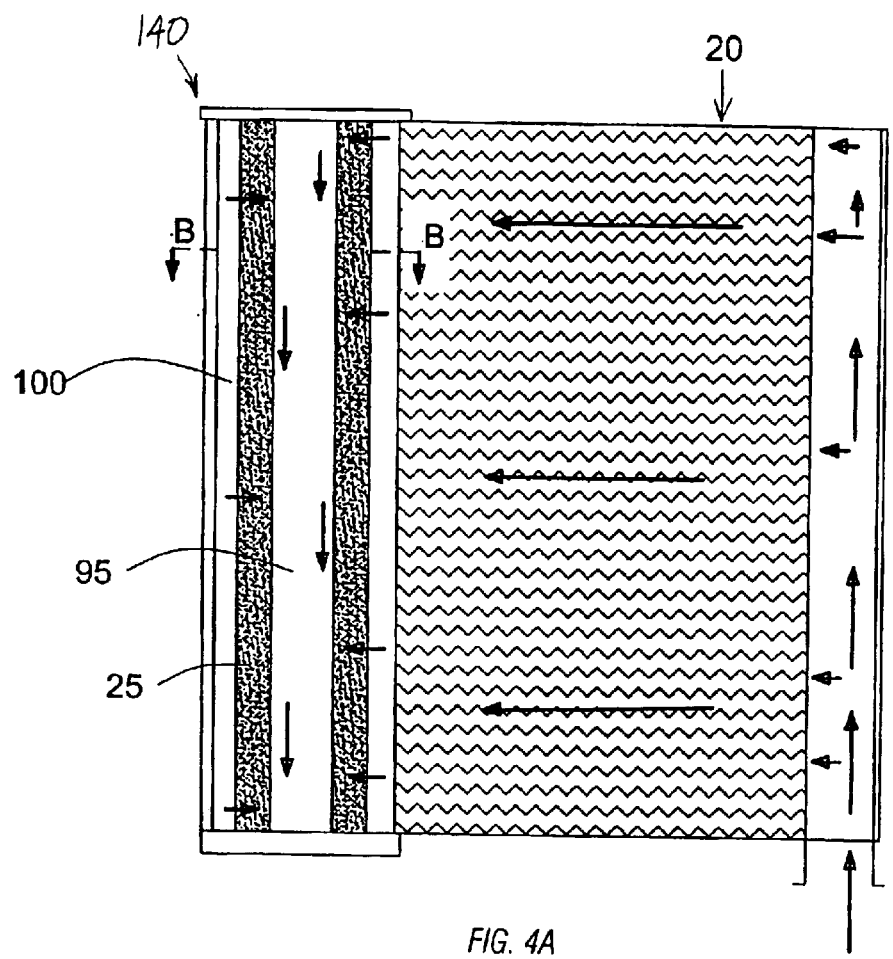
FIG. 4a is a cross-section view of an alternative recuperator and reactor bed construction.
Figure 4B:
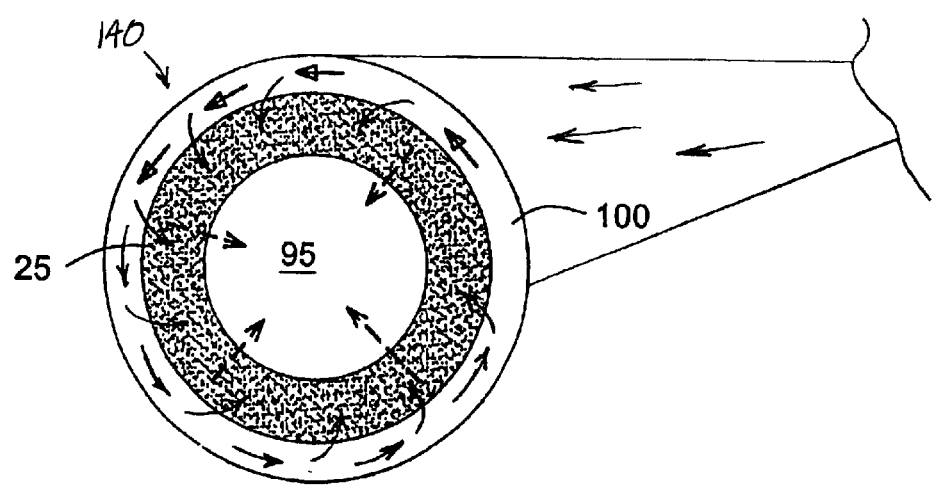

The reactor bed 65 may include a matrix of pebbles or a honeycomb structure, and may employ refractory or ceramic materials taking one of several forms including pebbles, structured foams, sintered powder, and extruded honeycomb material. Although FIGS. 2 and 3c illustrate the honeycomb version, FIG. 3a illustrates the pebble version, and FIGS. 4a and 4b illustrate the foam version, it will be appreciated that any version of the reactor bed 65 may be substituted for those illustrated. The reactor bed 65 is maintained at a temperature of between about 1600° F. and about 1850° F. Reaction products typically reach a peak excursion of nominally 120° F. above the matrix temperature.

At startup of the engine 10, the reactor bed 65 must be pre-heated to the desired operating temperature with an auxiliary heating device. The auxiliary heating device illustrated in FIG. 2 includes a pilot burner 105 that burns fuel 52a (e.g., natural gas, propane, methane, heptane, or other combustible fuel), and a blower that forces the products of combustion through the reactor bed 65. The blower function may be accomplished by driving the engine's main compressor 15 to force air through the reactor bed 65, or a dedicated blower or fan element mounted upstream or downstream of the auxiliary heating device to force airflow through the bed 65. Alternatively, the auxiliary heating device may include an electrical heating element 115 (shown in phantom in FIG. 2) within the reactor bed 65 to preheat it to the desired operating temperature. Once the desired operating temperature is achieved within the reactor bed 65, the auxiliary heating device may be deactivated and the flow of compressed air and fuel mixture may begin. Once the process has started, it is self-sustaining, and the conventional fuel may be decreased as the VOCs are consumed within the reactor. During normal engine operation, there is no flow of fuel to the pilot burners 105.

If the VOC-producing system 50 does not produce a sufficient concentration of VOCs to maintain operation of the engine, the VOCs can be supplemented with a flow of fuel (e.g., natural gas, propane, methane, heptane, or other combustible fuel) that is entrained into the air/fuel mixture to "richen" the mixture and make it more prone to combustion. The supplemental flow of fuel may also be used during standby, when the VOC-producing system 50 is not producing VOCs. During standby when VOCs are not present at the engine's intake, the supplemental flow of fuel may provide just enough energy to maintain the combustion cycle in the reactor bed 65. The supplemental fuel supply may also fuel the pre-heating burner 105.

FIGS. 3a–3e illustrate an alternative construction of the reactor chamber 25 and pre-heater 105 as that which is illustrated in FIG. 2. In this construction, the reactor chamber 25 is generally toroidal in shape, and the pre-heater 105 includes a plurality of ring-shaped burner elements 120 (shown in FIG. 3b) that are fed fuel from a main fuel manifold 125. The burner elements 120 spray fuel downwardly through jet apertures 130 (shown in FIGS. 3d and 3e). A shroud 135 (shown in FIG. 3e) having a generally semi-circular (or semi-cylindrical) cross-section surrounds the top and sides of the burner elements 120 to facilitate directing fuel down toward the reactor bed 65.

FIGS. 4a and 4b illustrate an alternative construction of the reactor chamber 25, which is cylindrically shaped. The reactor chamber 25 is wholly contained within the recuperator outlet manifold 140, and the conduit 95 and annular flow chamber 100 are defined by the respective inner and outer surfaces of the cylindrically-shaped reactor bed 65 within the outlet manifold. The reactor bed 65 in this construction may be referred to as a radial-inflow reactor bed 65. As shown in FIG. 4B, the fuel/air mixture passes from the annular flow chamber 100 through the reactor bed 65 where combustion occurs and into the conduit 95. From the conduit 95, the gas passes to the gasifier turbine 30 as previously described.

Although the invention has been described in detail with reference to certain preferred embodiments, variations and modifications exist within the scope and spirit of the invention as described and defined in the following claims.

What is claimed is:

1. A microturbine engine operable to combust a flow of VOCs without a combustor, the microturbine engine comprising:
   a compressor having an inlet, the inlet receiving a mixture of air and VOCs, the compressor produces a flow consisting of compressed air and VOCs;
   a reaction chamber including a reactor bed, the flow consisting of compressed air and VOCs being combusted within the reactor bed to produce a flow of products of combustion;
   a turbine driven by the flow of products of combustion from the combustor;
   a generator coupled to the turbine, the generator driven by the turbine at a speed to produce electrical power.

2. The microturbine engine of claim 1, wherein the compressor is a single stage radial flow compressor.

3. The microturbine engine of claim 1, wherein the reactor bed includes a honeycomb portion having a length, the flow of compressed air and VOCs being substantially combusted along the length of the reactor bed.

4. The microturbine engine of claim 1, wherein the reactor bed includes a plurality of pebbles defining a length, the flow of compressed air and VOCs being substantially combusted along the length of the reactor bed.

5. The microturbine engine of claim 1, further comprising a fuel burner spaced from the reactor bed, to initially heat said bed to its operational temperature.

6. The microturbine engine of claim 5, wherein the fuel burner includes a ring facing an inlet of the reactor bed, the ring including a plurality of gas nozzles directed at the reactor bed and operable to combust a gaseous fuel.

7. The microturbine engine of claim 5, further comprising a fuel inlet in fluid communication with the flow of compressed air and VOCs, the fuel inlet being selectively operable to deliver a flow of fuel to the engine.

8. The microturbine engine of claim 7, further comprising a sensor operable to measure a temperature, and a controller operably interconnected to the sensor and operable to control the flow of fuel delivered to the engine in response to the measured temperature.

9. The microturbine engine of claim 8, wherein the sensed temperature is a turbine inlet temperature.

10. The microturbine engine of claim 1, wherein the turbine includes a single stage radial flow turbine.

11. The microturbine engine of claim 1, wherein the generator is a synchronous generator.

12. A microturbine engine comprising:
   a compressor having an inlet in fluid communication with a mixture consisting of air and VOCs, the compresses operable to compress the mixture to produce a flow of compressed air and VOCs;
   a recuperator in fluid communication with the compressor to receive the flow of compressed air and VOCs, the flow of compressed air and VOCs exiting the recuperator as a flow of preheated compressed air and VOCs;
   a reaction chamber including a reactor bed, the flow consisting of preheated compressed air and VOCs being combusted within the reactor bed to produce a flow of products of combustion, the flow of products of combustion being heated to a desired temperature substantially by the recuperator and the reaction chamber;
   a turbine driven by the flow of products of combustion from the combustor; and
   a synchronous generator driven by the turbine to output electrical power.

13. The microturbine engine of claim 12, wherein the compressor is a single stage radial flow compressor.

14. The microturbine engine of claim 12, wherein the reactor bed includes a honeycomb portion having a length, the flow of compressed air and VOCs being substantially combusted along the length of the reactor bed.

15. The microturbine engine of claim 12, wherein the reactor bed includes a plurality of pebbles defining a length, the flow of compressed air and VOCs being substantially combusted along the length of the reactor bed.

16. The microturbine engine of claim 12, further comprising a fuel burner spaced from the reactor bed, to initially heat said bed to its operational temperature.

17. The microturbine engine of claim 16, wherein the fuel burner includes a ring facing an inlet of the reactor bed, the ring including a plurality of gas nozzles directed at the reactor bed and operable to combust a gaseous fuel.

18. The microturbine engine of claim 16, further comprising a fuel inlet in fluid communication with the flow of compressed air and VOCs, the fuel inlet being selectively operable to deliver a flow of fuel to the engine.

19. The microturbine engine of claim 18, further comprising a sensor operable to measure a temperature, and a controller operably interconnected to the sensor and operable to control the flow of fuel being delivered to the engine in response to the measured temperature.

20. The microturbine engine of claim 19, wherein the sensed temperature is a turbine inlet temperature.

21. The microturbine engine of claim 12, wherein the turbine includes a single stage radial flow turbine.

22. The microturbine engine of claim 12, wherein the recuperator includes a plate-fin heat exchanger.

23. A method of combusting VOCs without a combustor and generating electricity using a turbine operable to drive a synchronous generator, the method comprising:

operating a compressor to compress a flow consisting of air and VOCs;

delivering the compressed flow consisting of air and VOCs to a reaction chamber having a reactor bed;

passing the flow consisting of air and VOCs through the reactor bed, the reactor bed acting to combust the VOCs and produce a flow of products of combustion exiting the reactor bed at a desired temperature;

passing the flow of products of combustion through the turbine, the turbine rotating in response to the flow of products of combustion; and rotating the generator in response to the rotation of the turbine, the generator producing a flow of electricity.

24. The method of claim 23, further comprising selectively injecting a flow of fuel into the flow of air and VOCs, to initially heat said bed to its operational temperature.

25. The method of claim 24, further comprising measuring a temperature and injecting the flow of fuel in response to the measured temperature.

26. The method of claim 23, further comprising synchronizing the generator output to at least one of a priority load and a utility grid to provide usable electrical power.

* * * * *